(12) United States Patent
Döring et al.

(10) Patent No.: US 9,246,338 B2
(45) Date of Patent: Jan. 26, 2016

(54) ARRANGEMENT AND METHOD FOR SAFELY DISCHARGING AN ENERGY ACCUMULATOR

(75) Inventors: Harry Döring, Elchingen (DE); Harald Brazel, Ulm (DE); Michael Wörz, Neu-Ulm (DE); Olaf Böse, Berlin (DE); Hans-Georg Schweiger, Ingolstadt (DE)

(73) Assignees: ZENTRUM FUR SONNENENERGIE—UND WASSERSTOFF-FORSCHUNG BADEN-WURTTEMBERG GEMEINNUTZIGE STIFTUNG, Stuttgart (DE); CONTINENTAL AUTOMOTIVE GMBH, Munich (DE)

( * ) Notice: Subject to any disclaimer, the term of this patent is extended or adjusted under 35 U.S.C. 154(b) by 473 days.

(21) Appl. No.: 13/698,542
(22) PCT Filed: May 5, 2011
(86) PCT No.: PCT/EP2011/002248
§ 371 (c)(1),
(2), (4) Date: Jan. 18, 2013
(87) PCT Pub. No.: WO2011/144300
PCT Pub. Date: Nov. 24, 2011

(65) Prior Publication Data
US 2013/0127421 A1 May 23, 2013

(30) Foreign Application Priority Data
May 18, 2010 (DE) .......................... 10 2010 020 911

(51) Int. Cl.
*H02J 7/00* (2006.01)
*H01M 2/02* (2006.01)
*H01M 2/04* (2006.01)
*H01M 2/34* (2006.01)
*H01M 10/04* (2006.01)

(52) U.S. Cl.
CPC ................ *H02J 7/00* (2013.01); *H01M 2/024* (2013.01); *H01M 2/043* (2013.01); *H01M 2/34* (2013.01); *H01M 2/347* (2013.01); *H01M 10/04* (2013.01); *H01M 2200/00* (2013.01)

(58) Field of Classification Search
CPC .......................................................... H02J 7/00
USPC .......................................................... 320/135
See application file for complete search history.

(56) References Cited

U.S. PATENT DOCUMENTS

2003/0027036 A1    2/2003    Emori et al.

FOREIGN PATENT DOCUMENTS

| DE | 41 39 469 A1 | 6/1992 |
| DE | 695 03 543 T2 | 4/1999 |
| DE | 198 42 358 A1 | 3/2000 |
| DE | 103 36 726 A1 | 3/2005 |
| EP | 1 083 619 A2 | 3/2001 |

*Primary Examiner* — Thuan Do
(74) *Attorney, Agent, or Firm* — Nath, Goldberg & Meyer; Jerald L. Meyer; Tanya E. Harkins (57) ABSTRACT

Energy storage arrangement for safely discharging an energy accumulator with electric poles via which the energy accumulator can be at least discharged, an electrically conductive conductor medium in the form of a fluid or fine-grained bulk material or a mixture of both, a reservoir container which is filled with the conductor medium, a collecting container which is provided for accommodating the conductor medium and which encloses the electric poles of the energy accumulator, and a triggerable discharging device, by means of which, in the case of triggering, conductor medium is discharged from the reservoir container into the collecting container such that the electric poles of the energy accumulator are connected to one another in an electrically conductive fashion via the conductor medium.

20 Claims, 8 Drawing Sheets

ARRANGEMENT AND METHOD FOR SAFELY DISCHARGING AN ENERGY ACCUMULATOR

This is a National Phase Application filed under 35 U.S.C. §371 as a national stage of International Application No. PCT/EP2011/002248, filed on May 5, 2011, claiming the benefit from German Patent Application No. 102010020911.2, filed on May 18, 2010, the content of each of which is hereby incorporated by reference in its entirety.

The invention relates to an arrangement and to a method for safely discharging an energy accumulator.

Electro-chemical energy storage systems are generally used as components for storing energy in hybrid vehicles, plug-in hybrid vehicles and electric vehicles. These electro-chemical energy storage systems are usually based on nickel metal hydride technology (NiMH) or lithium ion technology (Li ion). Further technologies can also be used as energy supply means and storage means, such as for example double-layer capacitors, lead acid batteries or nickel zinc batteries or else air-breathing batteries which use an interaction between zinc and air or lithium and air.

Hybrid vehicles have an internal combustion engine, an electric machine and one or more electro-chemical energy accumulators. The stored quantity of energy permits at maximum purely electric driving of a few kilometers. Plug-in hybrid vehicles are of similar design to hybrid vehicles but have a larger electro-chemical energy accumulator which permits larger quantities of energy to be stored and a purely electric driving style over medium distances. The electro-chemical energy accumulators which are used can be charged from the power grid.

In the case of a purely electric vehicle, the drive power is made available solely by an electric machine. The electro-chemical energy accumulators which are used generally store quantities of energy which permit a range of more than 100 kilometers.

All the stated types of vehicle have in common the fact that large quantities of electrical energy have to be made available and transferred. The safety of the energy accumulator is here one of the central issues in the development of Li-ion batteries. A distinction is made here between the safety at the cell level and at the system level. The safety in terms of combustion at the cell level is influenced significantly by the selection of the electrolytes. According to the prior art, in Li-ion batteries electrolytes are used which are composed of at least one lithium salt, dissolved in a mixture of organic solvents, usually linear and cyclical organic carbonates or else esters. All currently used solvents can be ignited and burnt and therefore constitute a serious fire risk.

In other energy storage systems, combustible substances may also be present or formed. Double-layer capacitors also contain combustible electrolytes based on acetonitrile or propylene carbonate. Furthermore, in all aqueous systems such as, for example, in lead acid batteries and nickel zinc batteries the possibility of combustible hydrogen being formed cannot be ruled out.

The safety at the system level is generally ensured by energy control circuits including individual monitoring of cells in the intended operating mode. Such an energy control circuit determines the state of charge of the energy accumulator and controls, inter alia, main contactors for activating and deactivating the energy accumulator. Furthermore, the energy control circuit controls the energy flow, i.e. what quantity of energy is to be extracted from or fed to the accumulator.

The energy accumulator and/or the energy control circuit can be damaged as a result of incorrect use of the energy accumulator or as a result of an accident if the energy accumulator is arranged in a vehicle. As a result, for example, switching of the main contactors may no longer be possible, and as a consequence of this the contactors go into their position of rest, i.e. the main contactors are opened. However, in most cases the entire voltage continues to be present at the cells of the energy accumulator.

In this case, it has a disadvantageous effect that the energy accumulator can no longer be selectively discharged from the outside. As a result of the voltage which is present at the energy accumulator, it is then possible, for example, for a potential to be connected to a damaged housing which prevents recovery of the battery involved in the accident and puts recovery personnel in danger. Furthermore, there is the possibility of electrical short-circuits igniting the combustible electrolyte of the energy accumulator or fuel which has possibly escaped in the case of a vehicle involved in an accident.

The object of the present invention is to specify an arrangement and a method for safely discharging an energy accumulator, in particular for the case in which the energy accumulator and/or an associated energy control circuit which is connected thereto have been damaged by a defect or an accident.

The object is achieved by means of an arrangement according to Claim 1 and a method according to Claim 20. Refinements and developments of the inventive idea are the subject matter of dependent claims.

The object is achieved, in particular, by means of an energy storage arrangement having an energy accumulator with electric poles via which the energy accumulator can be at least discharged, and an electrically conductive conductor medium in the form of a fluid or fine-grained bulk material or a mixture of both, wherein the conductor medium is discharged from a reservoir container into a collecting container such that the electric poles of the energy accumulator are directly or indirectly connected to one another in an electrically conductive fashion via the conductor medium in the collecting container.

The object is also achieved by means of a method for safely discharging an energy accumulator, in which method, when a specific event occurs, electrically conductive conductor medium in the form of fluid or fine-grained bulk material or a mixture of both is placed between the electric poles and/or line parts which are electrically connected thereto, with the result that the electric poles of the energy accumulator and/or the electric line parts which are connected thereto are connected to one another in an electrically conductive fashion by the conductor medium.

The invention will be explained in more detail below with reference to the exemplary embodiments illustrated in the figures of the drawings, wherein identical elements are provided with identical reference symbols. In the drawings.

Figure 1:
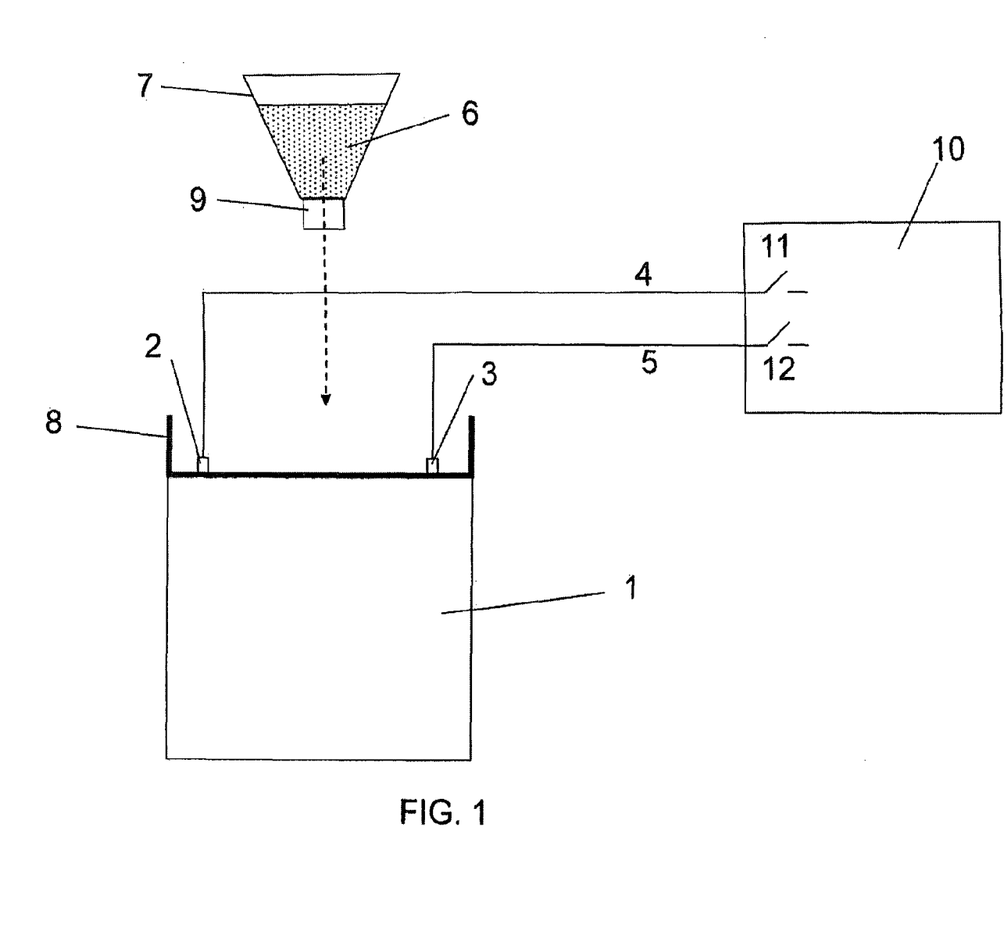
FIG. 1 shows a block diagram of an embodiment of an energy storage arrangement for safely discharging an energy accumulator via a conductor medium.

FIG. 1 shows a block diagram of an energy storage arrangement for safely discharging an energy accumulator 1 having poles 2 and 3 and electric lines 4 and 5 connected thereto. The energy storage arrangement also has a reservoir container 7 containing a conductor medium 6, a triggerable discharging device 9 which is connected to the reservoir container 7, a collecting container 8 and contactors 11 and 12 which are connected to the electric lines 4 and 5 and controlled by the energy control circuit 10.

As described further above, the energy accumulator 1 and/or the energy control circuit 10 can be damaged by incorrect use of the energy accumulator 1 or by an accident if the energy accumulator 1 is arranged, for example, in a vehicle. As a result, for example switching of the main contactors 11 and 12 in the energy control circuit 10 may no longer be possible, and as a result of this said main contactors 11 and 12 go into their position of rest, i.e. they are opened. However, the entire voltage continues to be present at the poles of the energy accumulator. As a result of the voltage which is present at the energy accumulator 1, it is then possible, for example, for a potential to be connected to vehicle components, which prevents recovery and puts recovery personnel in danger. Furthermore, there is the possibility of electrical short-circuits igniting the combustible electrolyte of the energy accumulator 1 or fuel which has possibly escaped in the case of a (hybrid) vehicle which has been involved in an accident.

Figure 3:
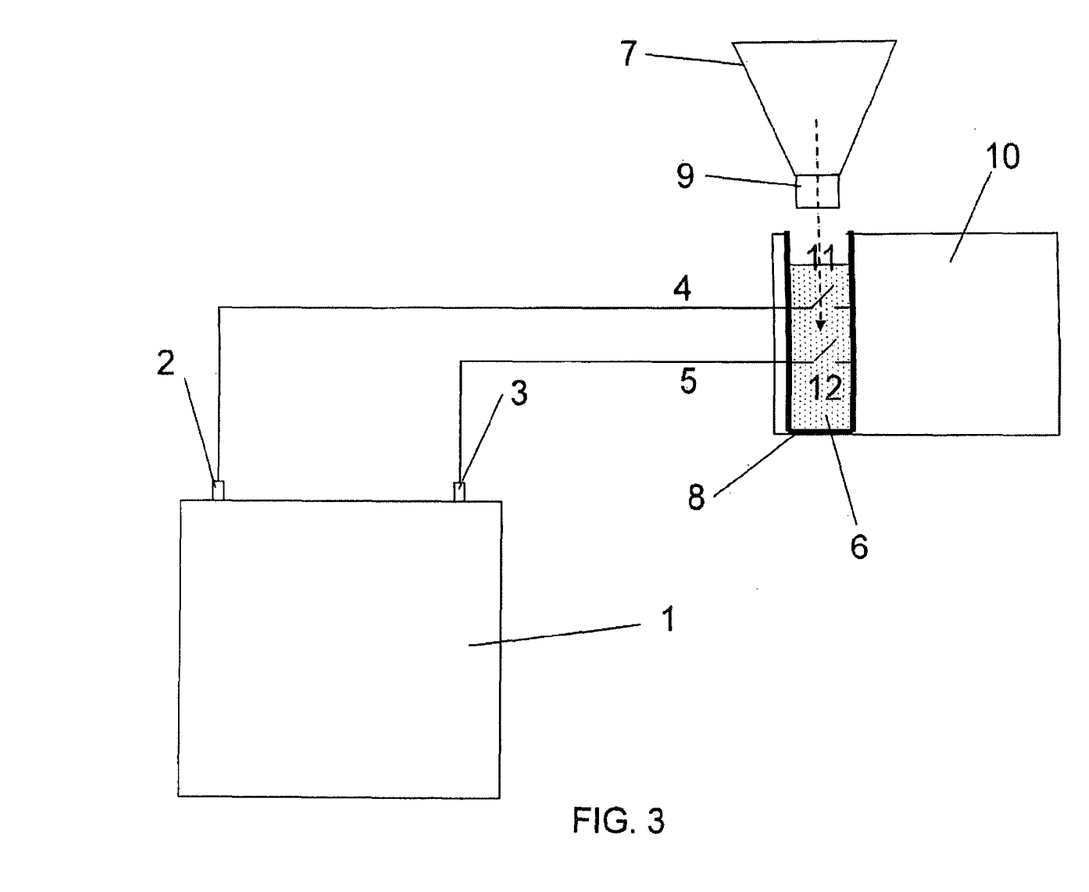
FIG. 3 shows a block diagram of a further embodiment of an energy storage arrangement after the discharging of a conductor medium into a collecting container which is arranged on an energy control circuit.

The inventive approach to a solution then provides that, for example, in a similar way to the triggering of an airbag by means of the triggerable discharging device 9, an electrically conductive conductor medium is discharged into the pole space, serving as a collecting container 8, of the cells (see FIG. 1) and/or a space around the contactors 11 and 12 of the energy control circuit 10 (see FIG. 3). The energy accumulator 1 is discharged in a controlled fashion by electrically connecting the energy accumulator poles 2, 3 directly (or indirectly via the lines 4, 5 and the contactors 11, 12 of the energy control circuit 10) by means of the electrically conductive conductor medium 6. In the process, the hazardous potential decreases continuously and after the complete discharge there is no longer any electrical risk presented by the energy accumulator 1.

As a result of the discharging of the energy accumulator 1, its internal chemical potential is also correspondingly reduced, with the result that even in the case of direct contact between the electrodes in the interior of the energy accumulator 1 (separator fracture, penetration of the cells during recovery etc.), the energy accumulator 1 likewise no longer presents any risk. The energy accumulator 1 can be handled without risk after the complete discharge.

The conductor medium 6 can contain foams, gels, pastes, microemulsions, solutions, chips, powder or grit or be composed thereof. The conductor medium 6 has, for example, electrically conductive material and electrically non-conductive material in a specific ratio with respect to one another, as a result of which a desired electrical conductivity of the conductor medium 6 is established. The electrical conductivity of the conductor medium 6 is dimensioned here in such a way that the discharging of the energy accumulator 1 does not occur in too short a time to avoid excessively high undesired generation of heat during the discharging of the energy accumulator 1. On the other hand, too small a value is not selected for the electrical conductivity of the conductor medium 6 either, in order to ensure a desired discharge time, which is as short as possible, of the energy accumulator 1 for the respective application.

The conductor medium 6 can have, for example, dispersed graphite as the electrically conductive material and non-conductive polymers as the electrically non-conductive material. In a further embodiment, the conductor medium 6 has, as an electrically conductive material, a salt which is dissolved in a non-conductive foam, gel, paste, microemulsion or in a non-conductive fluid. Here, for example quaternary mixtures of salt, water, oil and surfactant or ternary mixtures of surfactant, water and a co-solvent can be used or the conductor medium 6 can have anionic or cationic surfactants dissolved in water. Depending on the selection of the surfactant, a foam, a gel, a paste or a fluid can be formed.

Corresponding discharging of the energy accumulator 1 can also be achieved by sufficiently fine-grained solid bodies as conductor medium 6. Possible forms for this are, for example, powder, chips, grit or other finely distributed preparations. Possible materials are graphite, carbon, conductive polymers, semi-metals or poorly conductive alloys. The conductor medium 6 can also be embodied in the form of a fine-grained mixture of bulk material which has, for example, a conductive or averagely conductive polymer or a conductive alloy.

Figure 2:
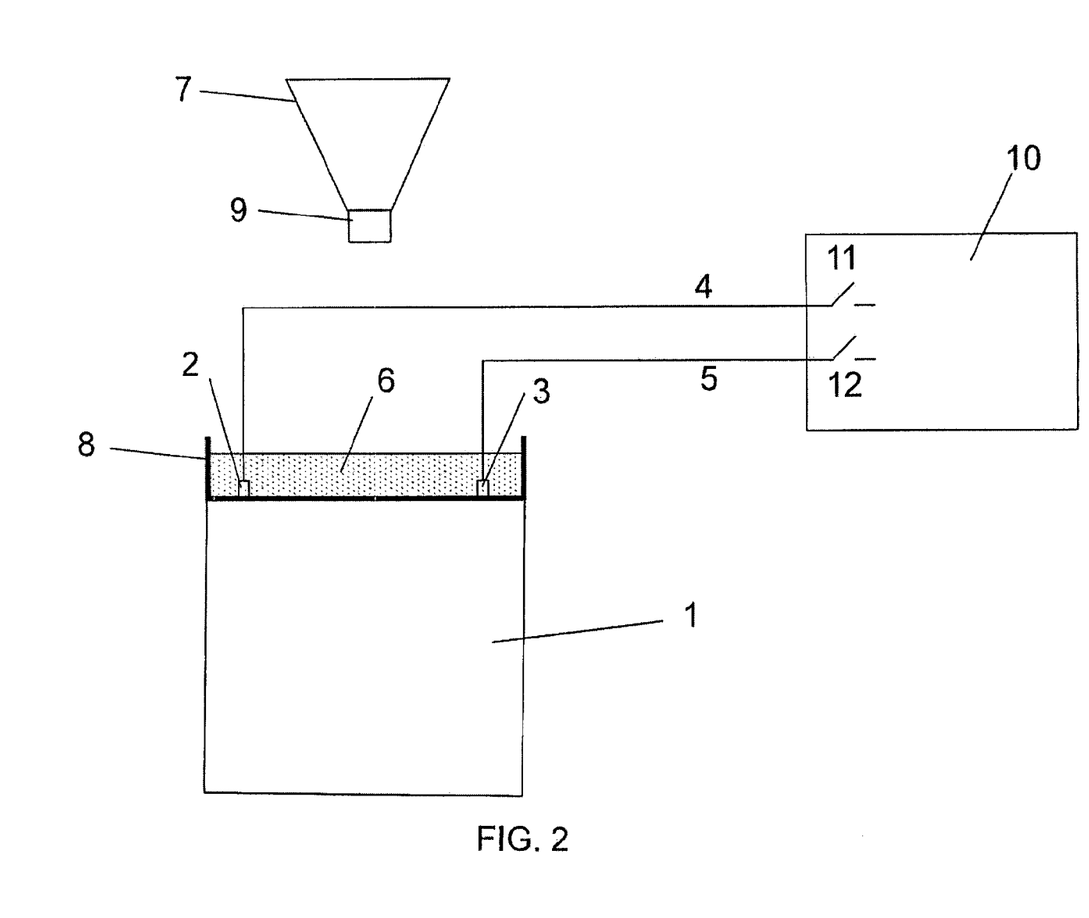
FIG. 2 shows a block diagram of the energy storage arrangement according to FIG. 1 after the discharging of a conductor medium into a collecting container which is arranged on the energy accumulator.

FIG. 2 shows the energy storage arrangement according to FIG. 1 after the discharging of the conductor medium 6 into the collecting container 8 (indicated by the arrow in FIG. 1) which is arranged on the energy accumulator 1. The poles 2 and 3 of the energy accumulator 1 and, for example, also parts of the lines 4 and 5 are connected to one another in an electrically conductive fashion by the conductor medium 6, as a result of which the desired discharging process of the energy accumulator 1 occurs with a discharging current which is given by the established conductivity of the conductor medium 6.

In the embodiment according to FIG. 1 and FIG. 2, the conductor medium 6 is accommodated in a reservoir container 7 which is embodied and arranged separately from the collecting container 8, that is to say in a separate installation space. The reservoir container 7 has a triggerable discharging device 9 which is connected to said reservoir container 7 and by means of which, in the case of triggering, the conductor medium 6 is discharged from the reservoir container 7 into the collecting container 8. The discharging of the conductor medium 6 takes place in such a way that the electric poles of the energy accumulator 1 are connected to one another in an electrically conductive fashion via the conductor medium 6.

The triggering of the discharging device 9 can take place manually here or directly or indirectly in reaction to an event. The discharging device 9 can for this purpose be embodied, for example, as a valve which can be activated manually or, for example, controlled electrically.

For a case in which the energy accumulator 1 is, for example, part of a hybrid vehicle, plug-in hybrid vehicle or electric vehicle, such an event can be damaging to the energy control circuit 10 and/or to the energy accumulator 1, for example as a result of a vehicle accident. Such damage may be detected, for example, by corresponding sensors and therefore indirectly bring about triggering of the discharging device 9. In another embodiment, the discharging device 9 itself can have a device such as, for example, a separate crash sensor if appropriate connected to microexplosive charges such as, for example, in the case of airbags, which directly triggers the discharging of the conductor medium 6 from the reservoir container 7 into the collecting container 8. As an alternative to this, a predetermined break point can also be provided at the connection between the reservoir container 7 and the collecting container 8, via which predetermined break point the discharging of the conductor medium 6 into the collecting container 8 then takes place.

FIG. 3 shows an energy storage arrangement according to FIG. 1 and FIG. 2 in which the collecting container 8 is not arranged on the energy accumulator 1 but instead in the energy control circuit 10. This may be advantageous, for example, when insufficient installation space is available directly at the energy accumulator 1 or when, for reasons of cost, changing of the energy accumulator 1 is not also to include changing of the collecting container 8 or adapting of the latter to the new energy accumulator. Similarly to the method according to FIG. 1 and FIG. 2, the conductor medium 6 is again discharged into the collecting container 8 here.

However, the collecting container 8 encloses some or all of the electrical contact points of the energy control circuit 10 and, for example, also the contactors 11 and 12. These are connected to one another in an electrically conductive fashion by the conductor medium 6 which is discharged from the correspondingly arranged collecting container 8, as a result of which, in turn, the energy accumulator 1 which is connected by means of the electric connecting lines 4 and 5 is discharged.

Figure 4:
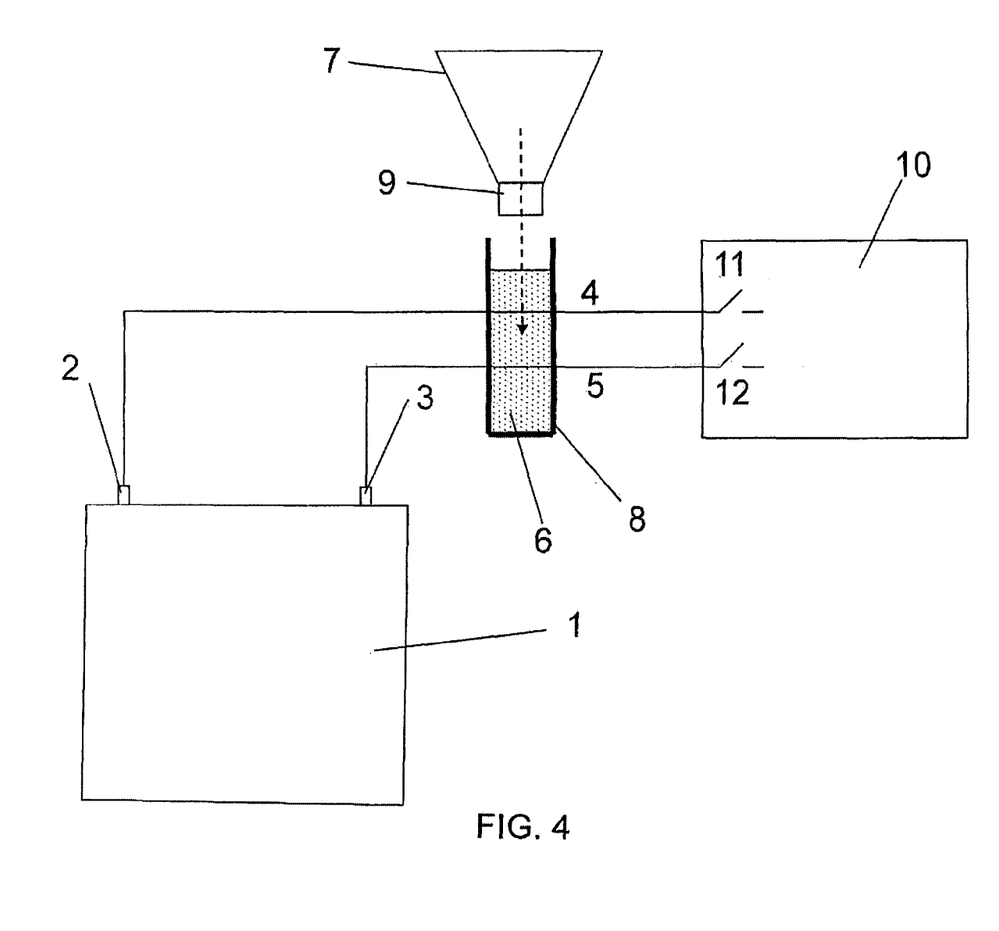
FIG. 4 shows a block diagram of a further embodiment of an energy storage arrangement after the discharging of a conductor medium into a collecting container which is arranged around some of the electric connecting lines.

In a further embodiment, the collecting container 8 is arranged between the energy accumulator 1 and the energy control circuit 10 in such a way that said collecting container 8 comprises exclusively partial regions of the electric connecting lines 4 and 5. A corresponding example is illustrated in FIG. 4, wherein the regions of the electric connecting lines 4 and 5 which run through the collecting container 8 are embodied at least partially as non-electrically insulated, with the result that the conductor medium 6 which is discharged from the reservoir container 7 into the collecting container 8 electrically connects to one another the connecting lines 4 and 5 which are connected to poles 2 and 3 of the energy accumulator 1, and as a result safely discharges the energy accumulator 1.

Figure 5:
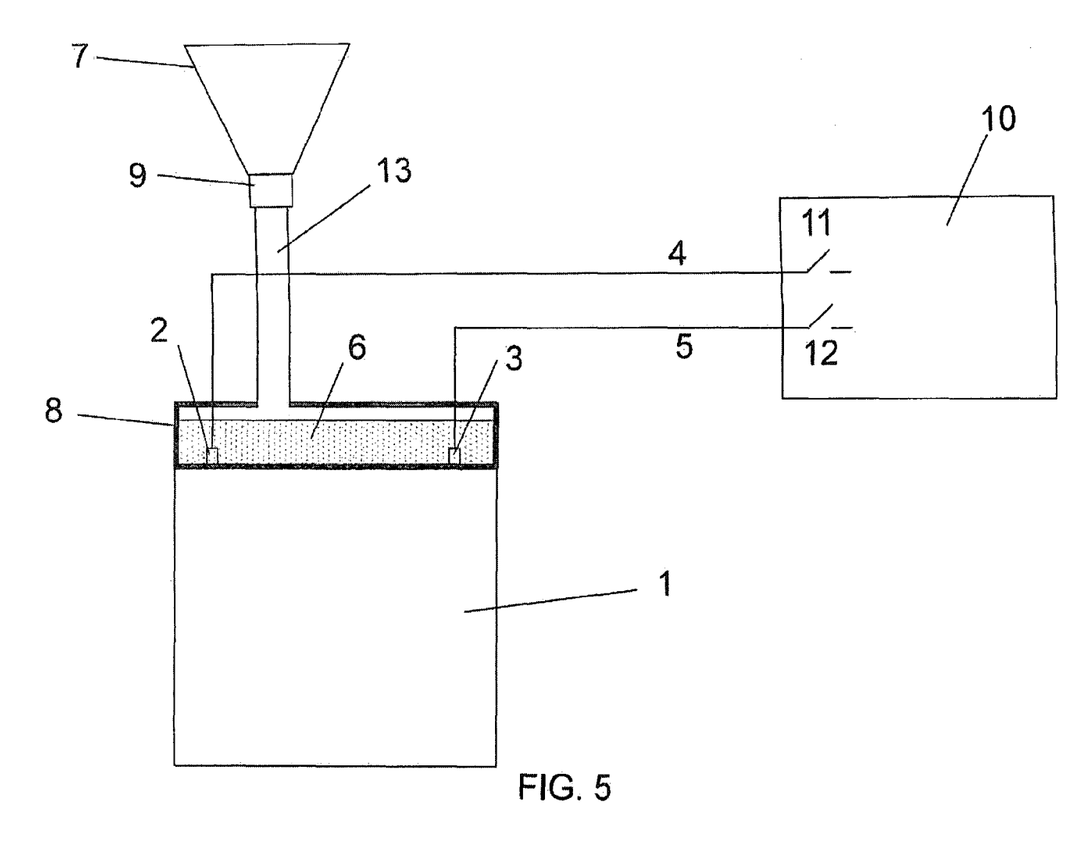
FIG. 5 shows a block diagram of a further embodiment of an energy storage arrangement after the discharging of a conductor medium into a sealed-off collecting container via a pipeline.

FIG. 5 shows a further exemplary embodiment in which the arrangement has a collecting container 8 which is sealed off from the surroundings, arranged, for example, around the poles of the energy accumulator 1 and therefore surrounds the poles 3 and 4 and/or parts of the electric connecting lines 4 and 5, and which is connected via an additional pipeline 13 to the discharging device 9 such as, for example, a valve or a pump, and to the reservoir container 7 for the conductor medium 6, which discharging device 9 can be triggered, for example, by a crash sensor 14. In this way, an arrangement which is closed off from the outside is obtained which avoids undesired escaping of conductor medium 6 into regions other than the collecting container 8 if at the same time the reservoir container 7 is also embodied as a sealed-off container. A similar embodiment of an arrangement which is sealed off from the surroundings is alternatively also possible for the arrangements shown in FIGS. 1 to 4.

Figure 6:
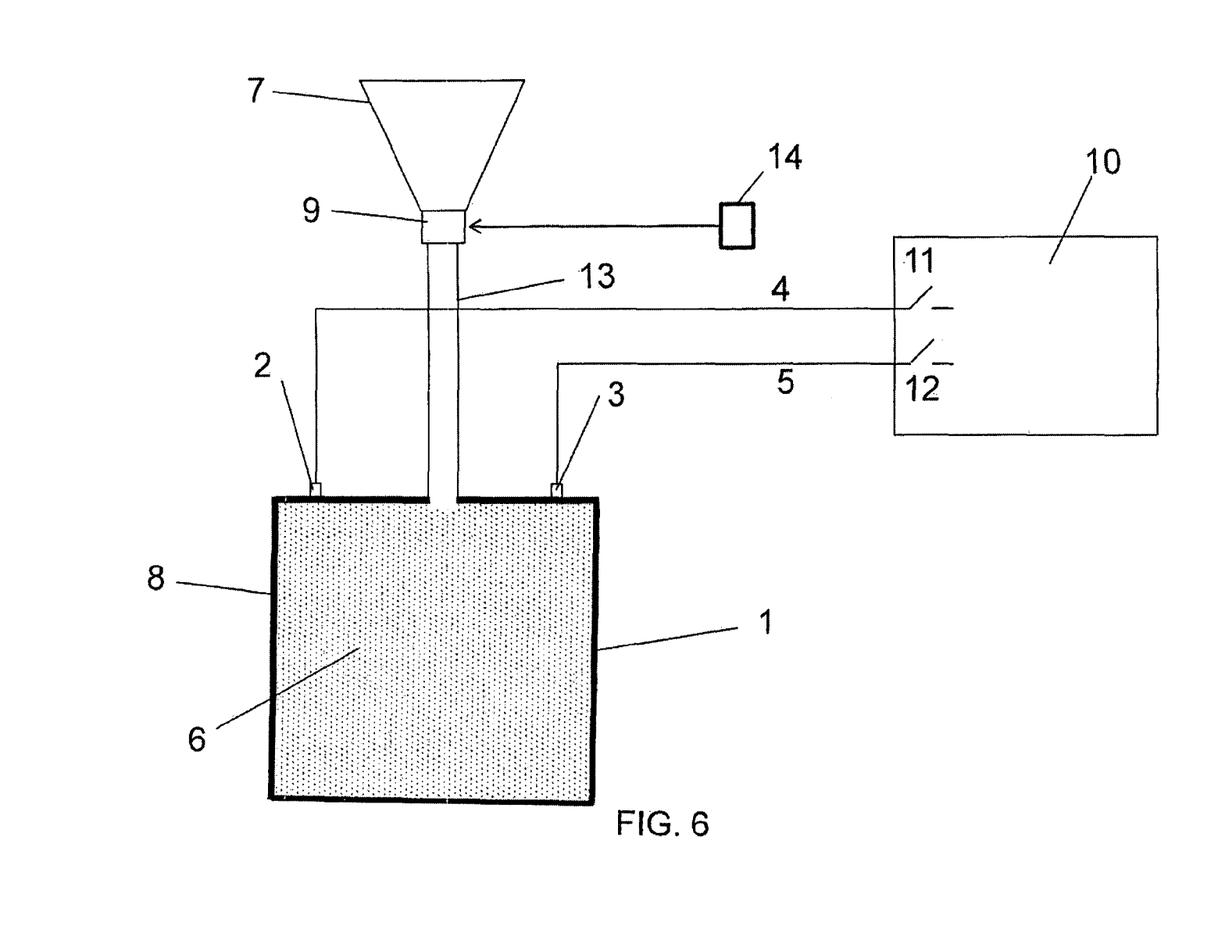
FIG. 6 shows a block diagram of a further embodiment of an energy storage arrangement after the discharging of a conductor medium into a sealed-off collecting container via a pipeline.

FIG. 6 shows an exemplary embodiment in which the energy accumulator 1 has a sealed-off housing, and the housing serves as a collecting container 8 which is connected via a pipeline 13 to the triggerable discharging device 9 and to the reservoir container 7 for the conductor medium 6. When the discharging device 9 is triggered, the conductor medium 6 is therefore discharged directly into the energy accumulator 1, and the controlled discharging of the energy accumulator 1 takes place by electrically conductive connection of internal components of the energy accumulator 1, such as for example a plurality of charge-carrying elements with different electrical potentials arranged in the energy accumulator 1 (for example electrodes).

Figure 7:
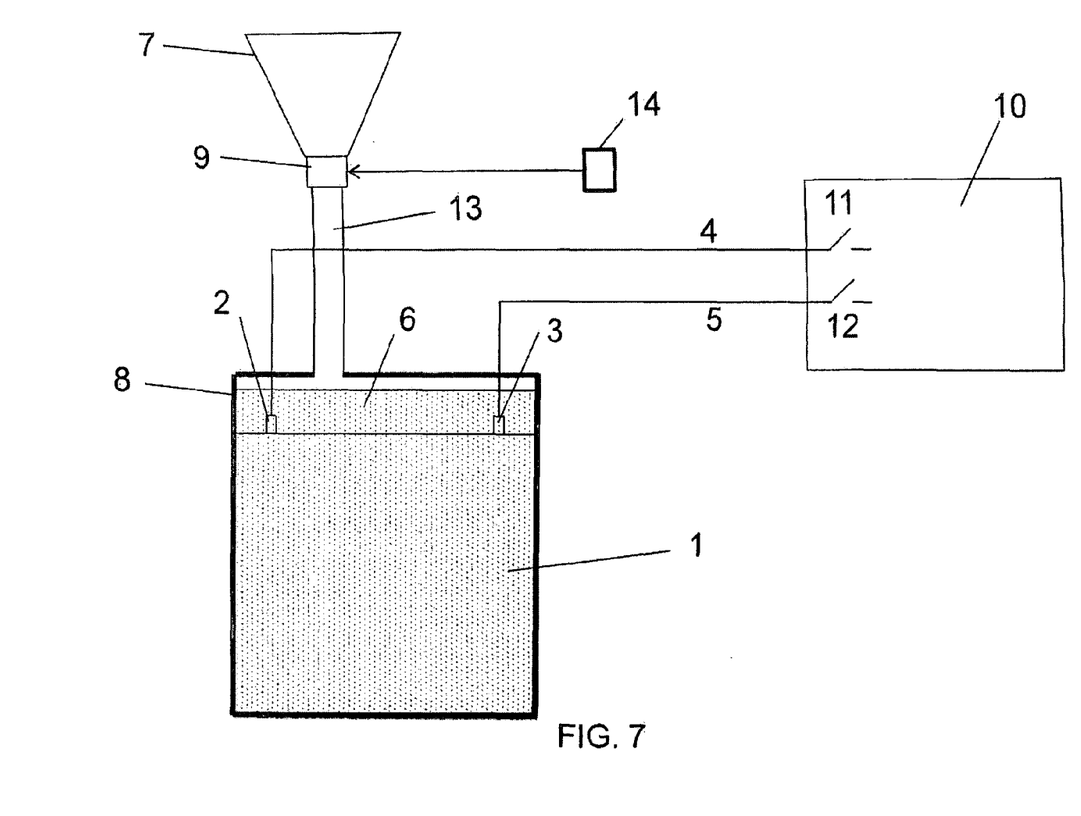
FIG. 7 shows a block diagram of a further embodiment of an energy storage arrangement after the discharging of a conductor medium into a sealed-off collecting container via a pipeline.

FIG. 7 shows an exemplary embodiment in which the energy accumulator 1 has a sealed-off housing, the housing surrounds the energy accumulator 1 and the poles 2 and 3 and/or parts of the electric connecting lines 11 and 12, and the housing is provided as a collecting container 8 which is connected via a pipeline 13 to the triggerable discharging device 9 such as, for example, a valve or a pump, and to the reservoir container 7 for the conductor medium 6. When the discharging device 9 is triggered by a crash sensor 14 with associated evaluation and control electronics, the conductor medium 6 is therefore discharged directly into the energy accumulator 1 and into the space around the poles 2 and 3 and/or parts of the electric connecting lines 11 and 12.

The controlled discharging of the energy accumulator 1 is carried out by electrically conductive connection of internal components of the energy accumulator 1 such as, for example, a plurality of charge-carrying elements with different electrical potentials arranged in the energy accumulator 1, and by electrically conductive connection of the poles 2 and 3 and/or parts of the electric connecting lines 11 and 12. The resulting discharge current is therefore divided among a plurality of electrical connections which are embodied by the conductor medium 6, as a result of which undesired locally tightly limited heating as a result of the discharging is avoided.

Figure 8:
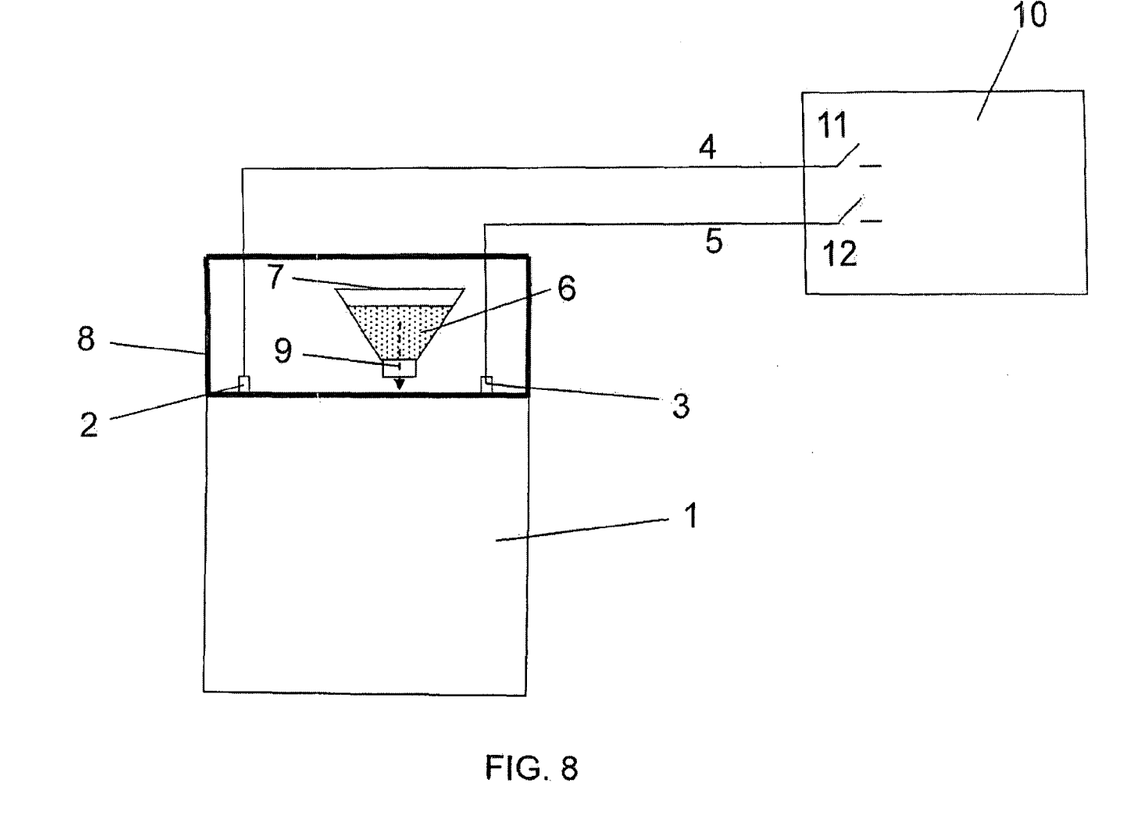
FIG. 8 shows a block diagram of a further embodiment of an energy storage arrangement having a reservoir container, arranged in a closed collecting container, for a conductor medium.

FIG. 8 shows an exemplary embodiment in which the reservoir container 7 is arranged inside the collecting container 8 which is sealed off from the surroundings. Such an arrangement is also possible for the embodiments shown in FIGS. 1 to 7. As a result, a possible pipe connection 13 between the reservoir container 7 and the collecting container 8 is advantageously dispensed with, and undesired escaping of the conductor medium 6 into regions other than the collecting container 8, for example in the case of arrangements which are not sealed off from the surroundings, is avoided.

In various embodiments of reservoir containers 7, the conductor medium 6 can be held already in, at or in the vicinity of the energy accumulator 1 or the energy control circuit 10. Possible embodiments of mounting means are here, for example, capsules, chambers, cylinders or containers 7 behind dividing walls which have a breakthrough or a predetermined break point between two regions. If the reservoir container 7 which is connected to the triggerable discharging device 9 is itself embodied as a closed system in the non-triggered state, the reservoir container 7 can be additionally filled with a discharging medium (for example a gas under pressure) in order to ensure rapid, complete and safe discharging of the conductor medium 6 when the discharging device 9 is triggered.

The invention claimed is:

1. Energy storage arrangement, for safely discharging an energy accumulator and/or an associated energy control circuit damaged by a defect or an accident, having an energy accumulator (1) with electric poles (2, 3), an electrically conductive conductor medium (6) in the form of a fluid or fine-grained bulk material or a mixture of both, a reservoir container (7) which is filled with the conductor medium (6), a collecting container (8) which is provided for accommodating the conductor medium (6), and a triggerable discharging device (9), wherein when the discharging device is triggered, the conductor medium (6) is released from the reservoir container (7) into the collecting container (8) to discharge the energy accumulator by electrically connecting the electric poles (2, 3) to one another with the conductor medium (6).

2. Arrangement according to claim 1, in which the poles (2, 3) are connected to electric lines (4, 5), and the electric poles (2, 3) of the energy accumulator (1) are connected to one another in an electrically conductive fashion, directly via the conductor medium (6) and/or indirectly via the conductor medium (6) and at least parts of the lines (4, 5).

3. Arrangement according to claim 1, in which the conductor medium (6) contains foams, gels, pastes, micro-emulsions, solutions, chips, powder or grit or is composed thereof.

4. Arrangement according to claim 1, in which the conductor medium (6) has electrically conductive material and electrically non-conductive material in a specific ratio with respect to one another.

5. Arrangement according to claim 4, in which the conductor medium (6) has dispersed graphite as the electrically conductive material and non-conductive polymers as the electrically non-conductive material.

6. Arrangement according to claim 4, in which the conductor medium (6) has, as an electrically conductive material, a salt which is dissolved in a non-conductive foam, gel, paste, microemulsion or in a non-conductive fluid.

7. Arrangement according to claim 1, in which the conductor medium (6) has anionic or cationic surfactants dissolved in water.

8. Arrangement according to claim 7, in which the conductor medium (6) additionally has a salt or an oil or both.

9. Arrangement according to claim 8, in which the conductor medium (6) has a conductive polymer or a conductive alloy in the form of fine-grained bulk material.

10. Arrangement according to claim 1, in which the collecting container (8) is arranged in, on or around the energy accumulator (1), and the conductor medium (6) which is discharged connects the electric poles (2, 3) of the energy accumulator (1) to one another in a conductive fashion.

11. Arrangement according to claim 1, in which the energy storage arrangement has an energy control circuit (10) which is electrically connected to the lines (4, 5), and the collecting container (8) is arranged in, on or around the energy control circuit (10) such that, in the case of triggering of the discharging device (9), the conductor medium (6) electrically connects to one another at least parts of the electric lines (4, 5) and/or switching contacts of the energy control circuit (10) which are electrically connected thereto.

12. Arrangement according to claim 1, in which the energy accumulator (1) has a housing, and the housing is provided as a collecting container (8).

13. Arrangement according to claim 1, in which a container which encloses the energy accumulator (1) and the poles (2, 3) of the energy accumulator (1) is provided as a collecting container (8).

14. Arrangement according to claim 1, in which the reservoir container (7) is arranged inside the collecting container (8).

15. Arrangement according to claim 1, in which the reservoir container (7) is arranged spatially above the collecting container (8).

16. Arrangement according to claim 1, in which the discharging device (9) discharges the conductor medium (6) to the collecting container (8) through a controlled valve or a predetermined break point.

17. Arrangement according to claim 1, in which the triggering of the discharging device (9) takes place when a specific event occurs.

18. Arrangement according to claim 17, in which the triggering event is damage to the energy accumulator control system and/or to the energy accumulator (1).

19. Arrangement according to claim 17, in which the triggering event is an accident of a motor vehicle.

20. A method for safely discharging an energy accumulator (1) having electric poles (2, 3) and/or an associated energy control circuit damaged by a defect or an accident comprising:

placing an electrically conductive conductor medium (6) in the form of fluid or fine-grained bulk material or a mixture of both between the electric poles (2, 3) and/or line parts which are electrically connected thereto, in reaction to an event, and thereby connecting the electric poles (2, 3) of the energy accumulator (1) and/or the electric line parts to one another in an electrically conductive fashion by the conductor medium (6).

* * * * *